US012601613B2

(12) United States Patent
Jarzomski et al.

(10) Patent No.: US 12,601,613 B2
(45) Date of Patent: Apr. 14, 2026

(54) SENSOR ARRANGEMENT HAVING A DUAL MAGNET

(71) Applicant: LORD Corporation, Cary, NC (US)

(72) Inventors: Michael Jarzomski, Apex, NC (US); Askari Badre-Alam, Cary, NC (US)

(73) Assignee: LORD Corporation, Cary, NC (US)

( * ) Notice: Subject to any disclaimer, the term of this patent is extended or adjusted under 35 U.S.C. 154(b) by 79 days.

(21) Appl. No.: 17/781,176

(22) PCT Filed: Dec. 22, 2020

(86) PCT No.: PCT/US2020/066626
§ 371 (c)(1),
(2) Date: May 31, 2022

(87) PCT Pub. No.: WO2021/133808
PCT Pub. Date: Jul. 1, 2021

(65) Prior Publication Data
US 2023/0003551 A1　　Jan. 5, 2023

Related U.S. Application Data

(60) Provisional application No. 62/953,652, filed on Dec. 26, 2019.

(51) Int. Cl.
*G01D 5/14* (2006.01)
(52) U.S. Cl.
CPC ......... *G01D 5/145* (2013.01); *G01D 2205/40* (2021.05)

(58) Field of Classification Search
CPC ........................... G01D 5/145; G01D 2205/40
See application file for complete search history.

(56) References Cited

U.S. PATENT DOCUMENTS

| | | | |
|---|---|---|---|
| 5,444,369 A | 8/1995 | Luetzow | |
| 7,208,943 B2 * | 4/2007 | Godoy ................. | G01D 11/245 174/521 |

(Continued)

FOREIGN PATENT DOCUMENTS

| | | |
|---|---|---|
| CN | 1751229 A | 3/2006 |
| DE | 10 2017 202374 A1 | 8/2017 |

(Continued)

OTHER PUBLICATIONS

International Search Report and Written Opinion for Application No. PCT/US2020/066626 dated Mar. 2, 2021.

(Continued)

*Primary Examiner* — Reena Aurora
(74) *Attorney, Agent, or Firm* — KDW FIRM PLLC

(57) ABSTRACT

The present subject matter relates to devices, systems, and methods for identifying the position of a movable component. A position sensor system is provided in which a Hall effect sensor is coupled to a fixed housing, and a plurality of magnets is coupled to a movable component that is movable to a sensing position at which the plurality of magnets is proximal to the Hall effect sensor. In this configuration, the plurality of magnets is arranged to produce an aggregate magnetic field having a flux concentration directed toward the Hall effect sensor when the plurality of magnets is in the sensing position.

14 Claims, 5 Drawing Sheets

(56)        References Cited

U.S. PATENT DOCUMENTS

| | | | | |
|---|---|---|---|---|
| 8,240,198 | B2 * | 8/2012 | Schade .................... | G01B 7/26 |
| | | | | 73/146 |
| 2004/0196030 | A1 | 10/2004 | Moreno et al. | |
| 2010/0289485 | A1 | 11/2010 | Eggimann | |
| 2011/0080162 | A1 | 4/2011 | Steinich et al. | |
| 2011/0101970 | A1 * | 5/2011 | Lanter ............... | B60R 21/01554 |
| | | | | 324/207.25 |
| 2017/0343383 | A1 * | 11/2017 | Kishi ..................... | G01D 5/145 |
| 2019/0028001 | A1 * | 1/2019 | Forthaus ............. | H02K 11/215 |
| 2019/0181716 | A1 | 6/2019 | Jarzomski et al. | |
| 2021/0088603 | A1 * | 3/2021 | Bidaux .................. | G01R 33/02 |
| 2022/0333952 | A1 * | 10/2022 | Schrubbe ............... | G01D 5/145 |

FOREIGN PATENT DOCUMENTS

| | | | | |
|---|---|---|---|---|
| EP | 0 611 951 | A2 | 8/1994 | |
| EP | 1 548 408 | A2 | 6/2005 | |

OTHER PUBLICATIONS

Chinese Office Action for Application No. 2020800890844 dated Aug. 10, 2023.

Canadian Office Action for Application No. 3161797 dated Aug. 22, 2023.

Chinese Office Action for Application No. 02080089084 dated Jan. 10, 2024.

European Office Action for Application No. 20842516 dated Feb. 19, 2024.

Intention to Grant for EP Application No. 20842516.5, dated Sep. 26, 2024, 25 pages.

Intention to Grant for EP Application No. 20842516.5, dated Dec. 5, 2024, 25 pages.

European Search Report in EP Application No. 25174338.1 dated Jul. 28, 2025, 6 pages.

* cited by examiner

*FIG. 2B*          PRIOR ART

SENSOR ARRANGEMENT HAVING A DUAL MAGNET

CROSS-REFERENCE TO RELATED APPLICATION

This application claims priority to U.S. Provisional Patent Application Ser. No. 62/953,652 filed Dec. 26, 2019, the disclosure of which is incorporated herein by reference in its entirety.

TECHNICAL FIELD

The subject matter disclosed herein relates generally to devices, systems, and methods for measuring the angular position of a rotating system. More particularly, the subject matter disclosed herein relates to sensor systems that use Hall effect sensors.

BACKGROUND

Non-contact sensors are useful for monitoring the position of moving components since they have few moving parts and thus generally exhibit high durability. An example of such a non-contact sensor is a Hall effect sensor, which can measure the magnitude of a magnetic field. A typical Hall effect sensor arrangement is illustrated in FIGS. 1, 2A, and 2B. Such an arrangement includes a single magnet 10 carried by a magnet carrier 11, the magnet 10 being polarized through the width of the magnet and a Hall effect sensor 12 that is spaced apart from the magnet 10 in a direction that is substantially perpendicular to the direction of the magnetic field of the magnet. The effectiveness of this kind of sensor arrangement relies on the magnet 10 producing a magnetic field with sufficient rough gain to ensure sensor functionality.

In some configurations, however, such as where the sensor magnet 10 and the Hall effect sensor 12 are separated by a field of a magnetically-responsive medium 13, the magnetic flux at the Hall effect sensor 12 is reduced. This reduction is illustrated in one exemplary configuration illustrated in FIG. 2A. Alternatively or in addition, in some configurations, the magnet carrier 11 or other structure surrounding the magnet 10 includes other magnetically-responsive materials such as steel, which likewise acts to concentrate the magnetic flux, resulting in a reduction in the magnetic flux experienced at the Hall effect sensor 12, such as is illustrated in FIG. 2B. In any of these arrangements, a reduction in magnetic flux reduces the rough gain and thus the sensor magnetic performance. In addition, design limitations imposed by using magnetically-responsive material can further limit the performance of standard magnets provided or recommended by sensor manufacturers.

SUMMARY

In accordance with this disclosure, devices for identifying the position of a movable component are provided. In one aspect, a position sensor system is provided in which a Hall effect sensor is coupled to a fixed housing, and a plurality of magnets is coupled to a movable component that is movable to a sensing position at which the plurality of magnets is proximal to the Hall effect sensor. In this configuration, the plurality of magnets is arranged to produce an aggregate magnetic field having a flux concentration directed toward the Hall effect sensor when the plurality of magnets is in the sensing position.

In another aspect, a method for identifying the position of a movable component includes coupling a Hall effect sensor to a fixed housing, arranging a plurality of magnets on a movable component that is movable relative to the fixed housing, and moving the movable component to a sensing position at which the plurality of magnets is proximal to the Hall effect sensor, wherein the plurality of magnets is arranged to produce an aggregate magnetic field having a flux concentration directed toward the Hall effect sensor when the plurality of magnets is in the sensing position.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIGS. 2A and 2B are partial side cutaway views illustrating magnetic flux patterns in conventional Hall effect sensor arrangements.

DETAILED DESCRIPTION

The present subject matter provides configurations for a Hall effect sensor system in which a plurality of magnets are arranged to create a more directed magnetic field having a stronger flux concentration axially in the direction of the Hall effect sensor. In some embodiments, an arrangement of multiple magnets that exhibits polarization across the length of the magnet arrangement is used in place of a single magnet that is polarized across its width. In some embodiments, this magnet arrangement includes two permanent magnets placed side by side with reversed polarity to complete the magnetic circuit.

Figure 1:
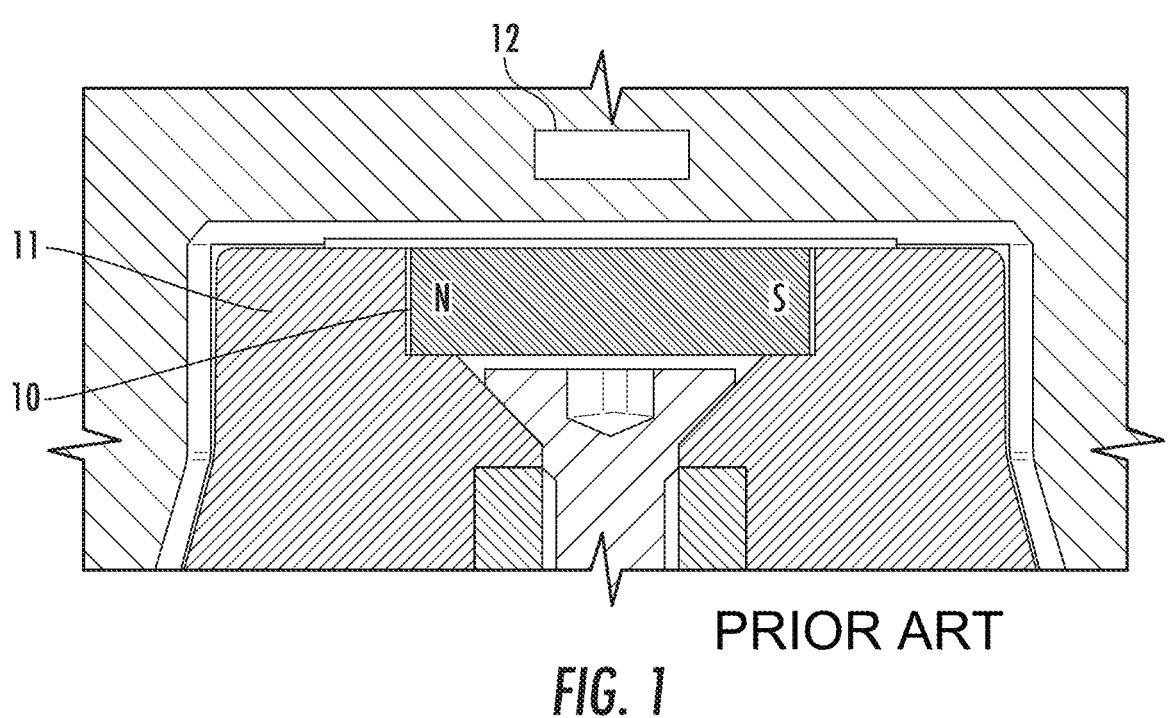
FIG. 1 is a partial side cutaway view of a conventional Hall effect sensor arrangement.
Figure 2A:
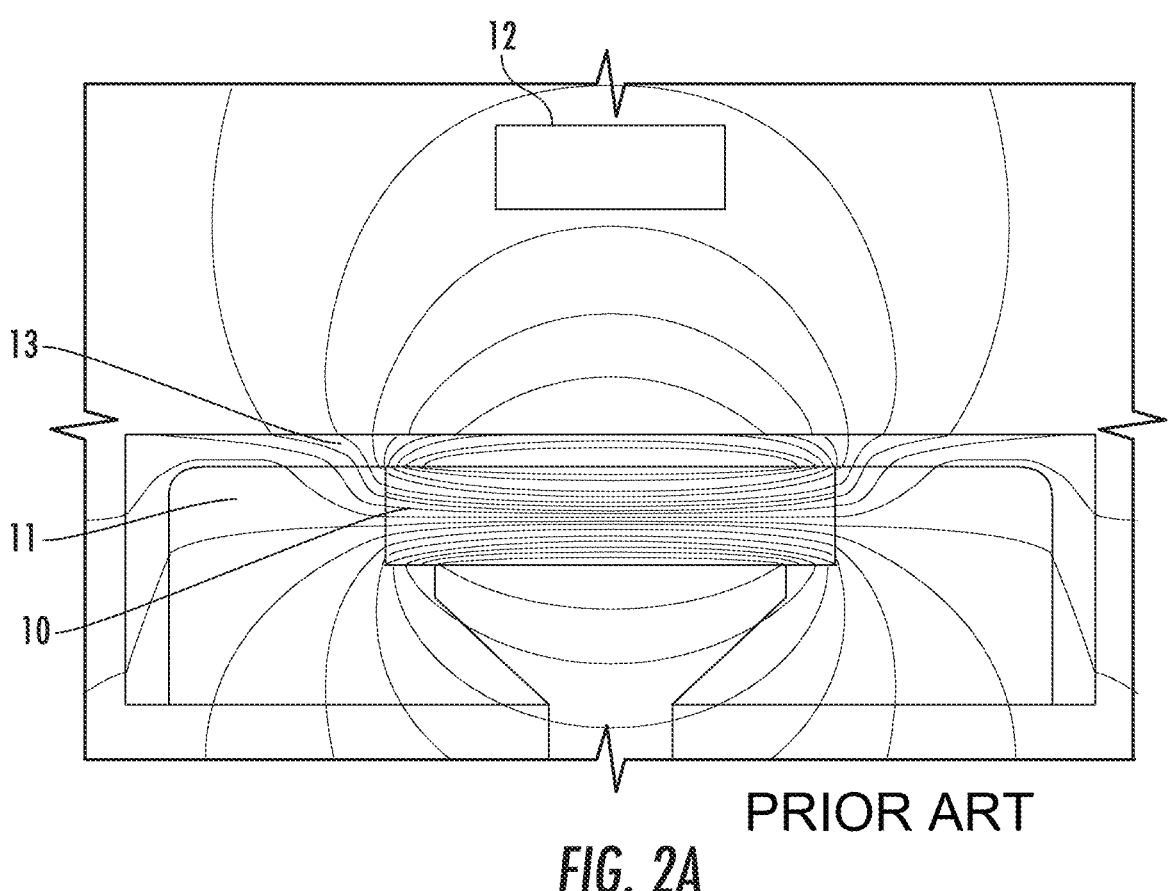
Figure 3:
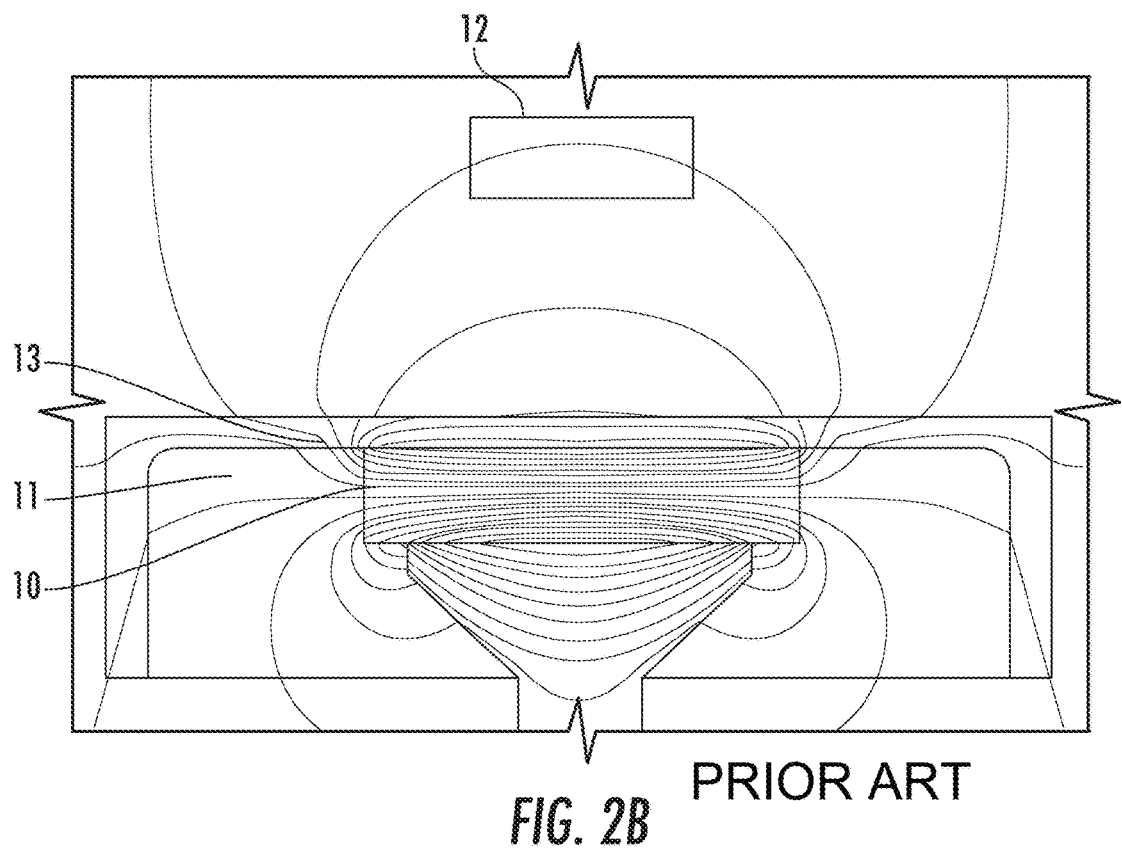
FIG. 3 is a partial side cutaway view of a Hall effect sensor arrangement according to an embodiment of the presently disclosed subject matter.
Figure 3:
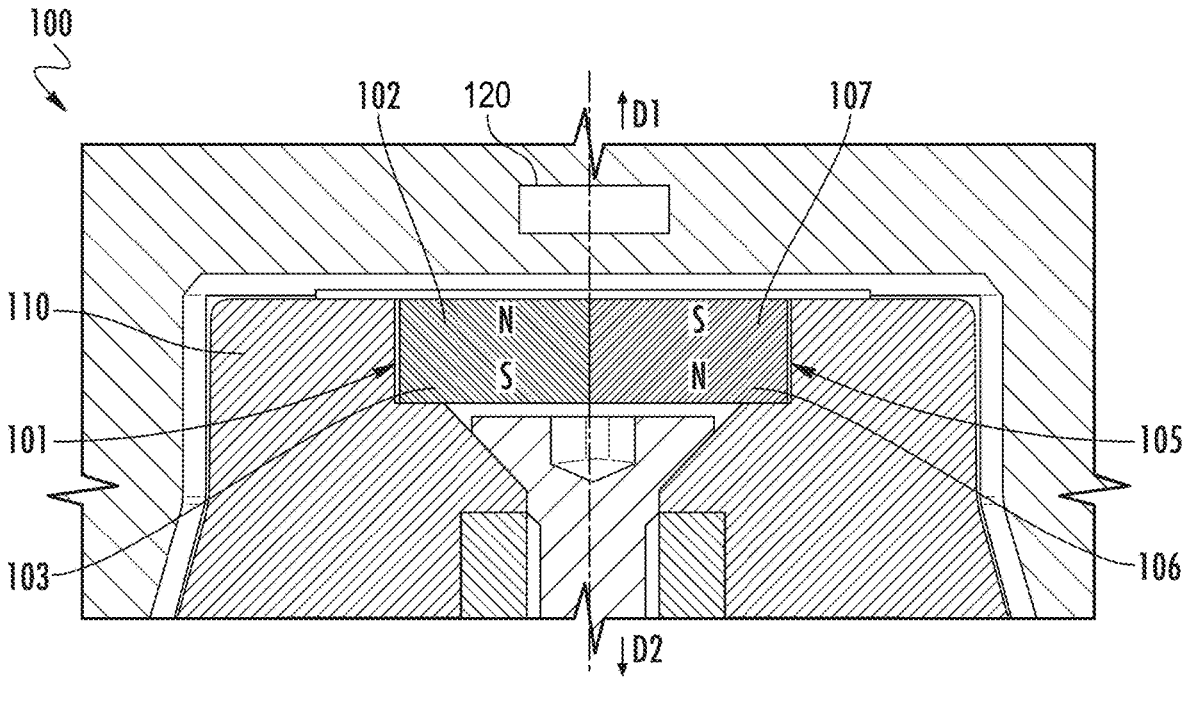

In one exemplary arrangement illustrated in FIG. 3, a sensor system, generally designated 100, includes a first magnet 101 and a second magnet 105 arranged next to the first magnet 101. The first magnet 101 is arranged with a first pole 102 oriented at least generally in a first direction D1 and a second pole 103 oriented at least generally in a second direction D2 substantially opposite from the first direction D1. A second magnet 105 has a first pole 106 oriented at least generally in the second direction D2, wherein the first pole 106 of the second magnet 105 has a polarity that matches a polarity of the first pole 102 of the first magnet 101. The second magnet 105 further has a second pole 107 that is oriented at least generally in the first direction D1, wherein the second pole 107 of the second magnet 105 has a polarity that matches a polarity of the second pole 103 of the first magnet 101. This configuration of the first magnet 101 and the second magnet 105 in a side-by-side arrangement with reversed polarities creates an aggregate magnetic field that has a shape that is somewhat similar to that of a typical sensor magnet, but the magnetic field is more concentrated in the first direction D1 and the second direction D2.

In some embodiments, the sensor system 100 provides improved performance of a sensor configuration similar to the conventional sensor arrangement discussed above. In the configuration illustrated in FIG. 3, the first magnet 101 and the second magnet 105 are carried together by a magnet carrier 110, and a Hall effect sensor 120 is spaced apart from the first magnet 101 and the second magnet 105 in the first direction D1. The magnet carrier 110 is movable with respect to the Hall effect sensor 120 to at least a sensing position at which the first magnet 101 and the second magnet 105 are proximal to the Hall effect sensor 120. In some embodiments, such a sensing position is a position at which the magnet carrier 110 having the first magnet 101 and the second magnet 105 is proximal to the Hall effect sensor 120 within a threshold at which the Hall effect sensor 120 can be used to identify the relative position of the magnet carrier 110. In some embodiments, the first magnet and the second magnet 105 are positioned side-by-side in the magnet carrier 110 such that the magnets are substantially equidistant from the Hall effect sensor 120 when in this proximal sensing position.

Figure 4A:
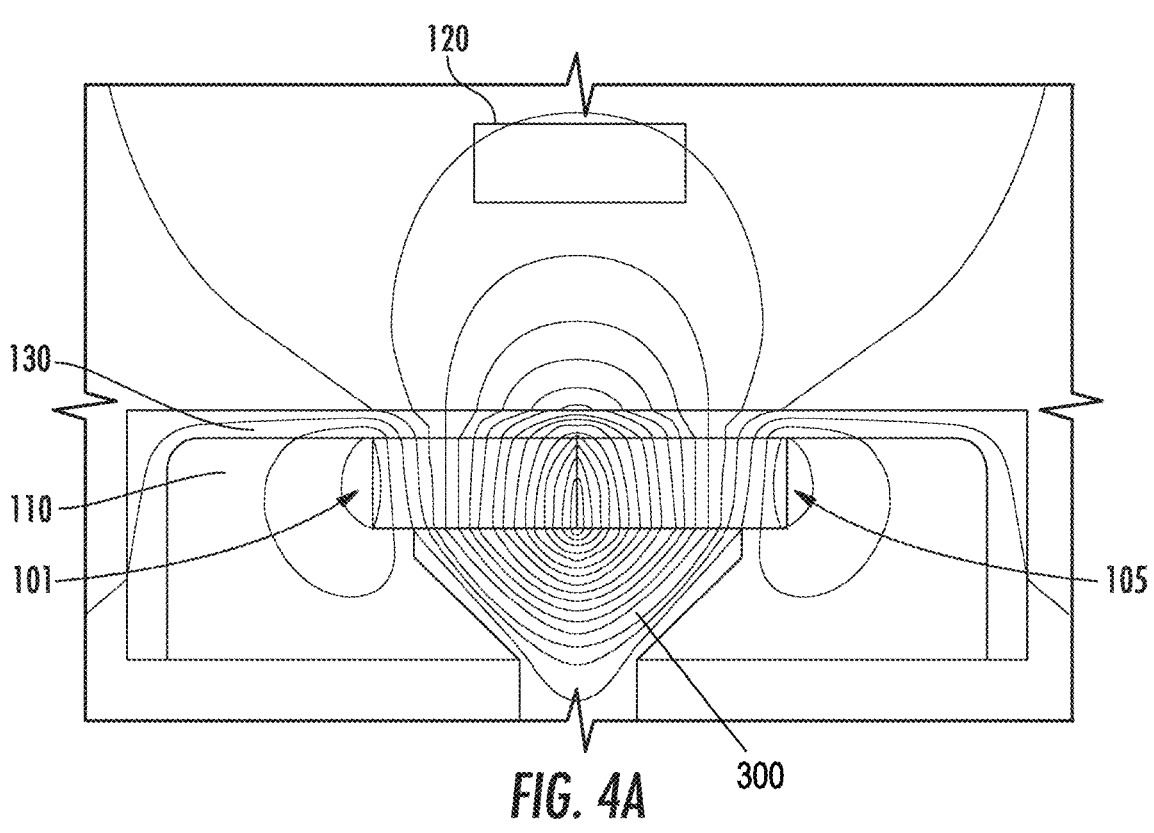
FIGS. 4A and 4B are partial side cutaway views illustrating magnetic flux patterns in Hall effect sensor arrangements according to embodiments of the presently disclosed subject matter.
Figure 4B:
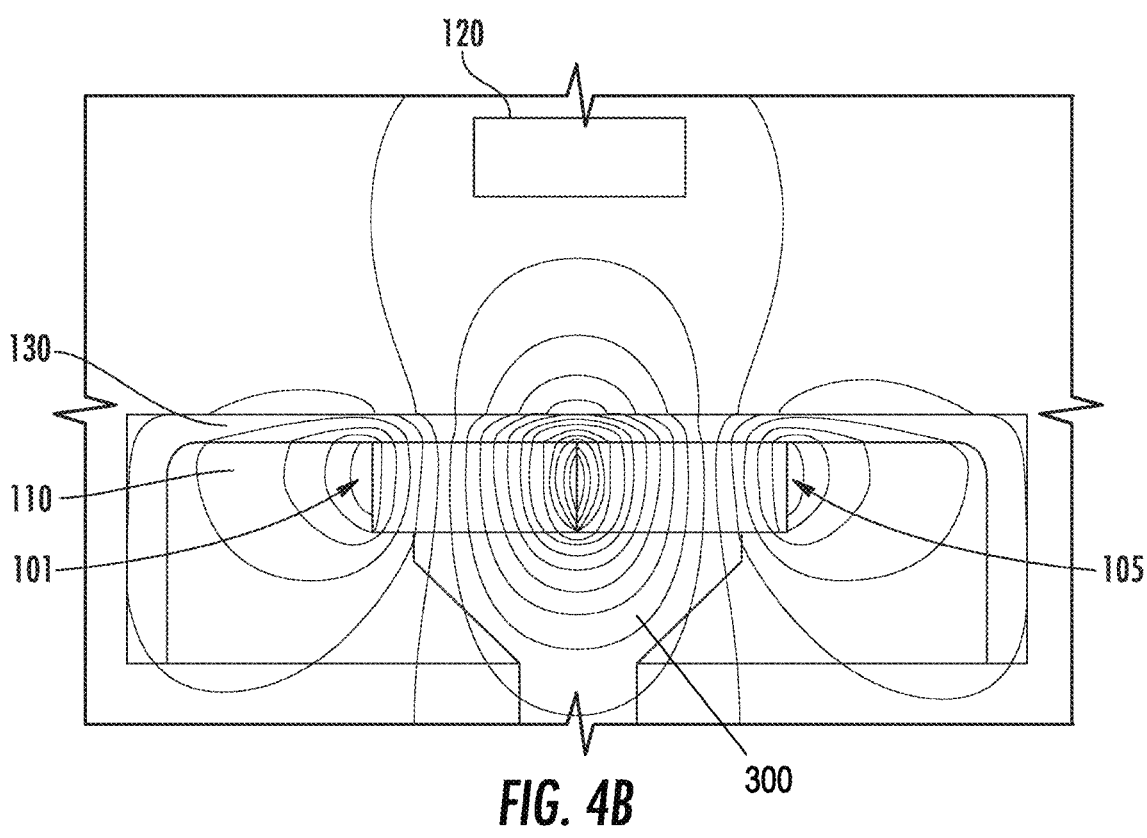

The directional concentration of the magnetic field that results from the arrangement of the first magnet 101 and the second magnet 105 discussed above helps to ensure that the magnetic field at the Hall effect sensor 120 has sufficient rough gain to ensure sensor functionality. This directional concentration of the magnetic field compensates for configurations that tend to cause deterioration of sensor functionality in conventional sensor systems. In some embodiments where a magnetically-responsive medium 130 is provided between the Hall effect sensor 120 and the first and second magnets 101 and 102, because a directed magnetic field is produced by the arrangement of the first magnet 101 and the second magnet 105, the magnetically-responsive medium 130 does not significantly diminish the magnetic field directed toward the Hall effect sensor 120, such as is illustrated in FIG. 4A. In some embodiments, the presence of other magnetically-responsive materials on a side of the sensor system 100 opposing the Hall effect sensor 120 shorts the lower poles, resulting in a higher flux concentration in the direction of the Hall effect sensor 120, such as is illustrated in FIG. 4B. In some embodiments, this other magnetically-responsive material includes the magnet carrier 110 or one or more elements thereof being composed of steel.

Figure 5:
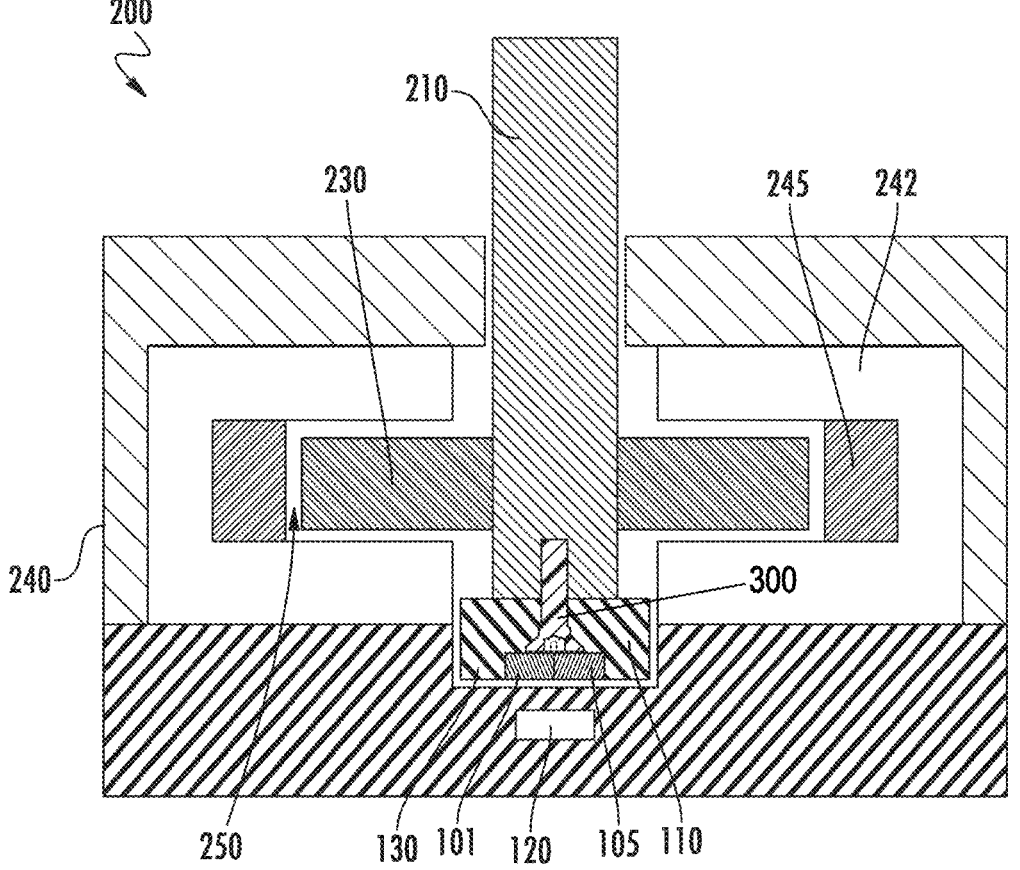
FIG. 5 is a side cutaway view of a rotary component incorporating a Hall effect sensor arrangement according to an embodiment of the presently disclosed subject matter.
Figure 6:
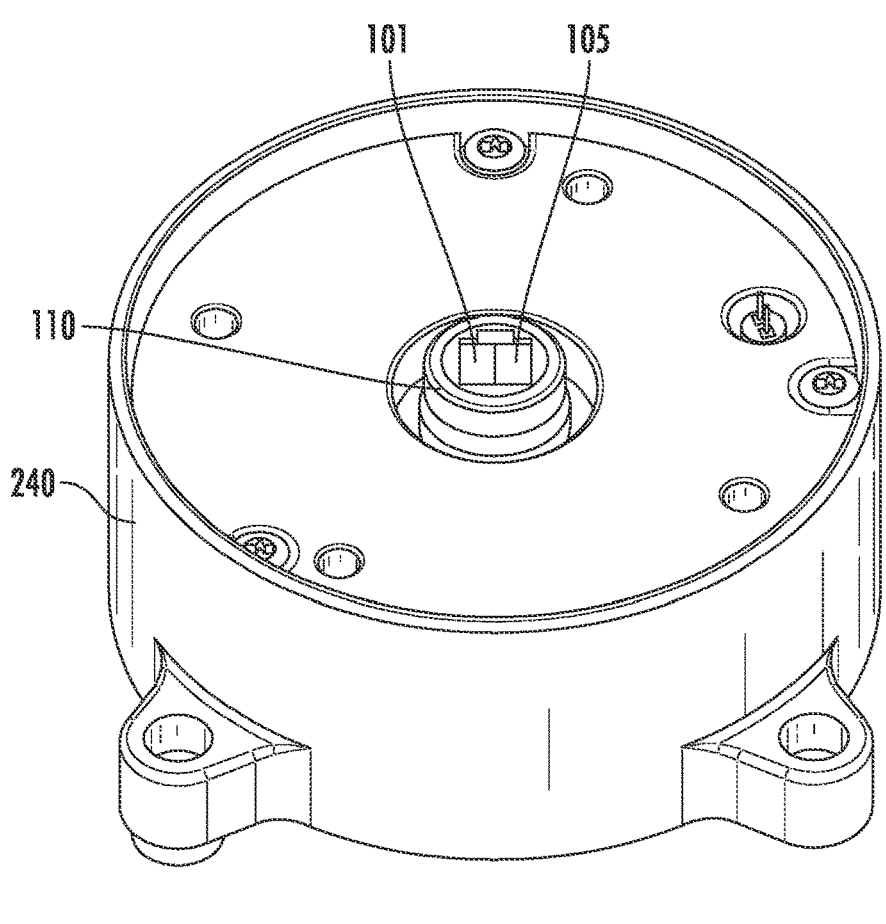
FIG. 6 is a top perspective view of a portion of a rotary component having a plurality of magnets for use in a Hall effect sensor arrangement according to an embodiment of the presently disclosed subject matter.

In some embodiments, the present subject matter provides particular utility for devices in which the sensor system 100 is associated with a rotating member that moves within a field of a magnetically-responsive medium. In one embodiment illustrated in FIGS. 5 and 6, a magnetically-responsive device generally designated 200 includes a shaft 210 to which a rotor 230 and the magnet carrier 110 are interconnected by a ferrous retention screw 300 to restrain relative rotation therebetween. In some embodiments, a housing 240 is positioned substantially about the shaft 210, the rotor 230, and the magnet carrier 110. The Hall effect sensor 120 is attached to or integrated within the housing 240. In addition, one or more pole 242 is attached to or integrated within the housing 240, and a magnetic field generator 245 associated with the pole 242 is spaced from the rotor 230 by a void 250. A magnetically responsive medium 130, such as a magnetically-responsive powder such as iron powder, is contained within and at least partially fills the void 150, including within a space separating the magnet carrier 110 from the housing 240 and the Hall effect sensor 120. In this arrangement, the magnetic field generator 145 is controllable to cause the magnetically-responsive medium 130 to align along the flux path within the void 150 and thereby cause a change in torsional resistance of the rotor 230 (and the shaft 210).

In a rotating system of this kind, the first magnet 101 and the second magnet 105 are rotatable in a plane, wherein the first direction D1 with which the magnetic field of the first magnet 101 and the second magnet 105 is aligned is substantially orthogonal to the plane of rotation. In this arrangement, the magnets are moved relative to the Hall effect sensor 120 such that changes in the flux concentration directed toward the Hall effect sensor 120 is recognized as a change in relative position between the elements. In some embodiments, this change in position includes a change in proximity between the magnets and the Hall effect sensor 120, wherein the magnets are rotated to a sensing position once per rotation at which the magnets are proximal to the hall effect sensor 120. Alternatively or in addition, in some embodiments, the Hall effect sensor 120 detects a change in the angular orientation of the magnetic field produced by the magnets, and this angular orientation is correlated to the angular position of the magnets relative to the Hall effect sensor 120. By using the sensor system 100 in any such configuration, the improved directionality of the magnetic field compensates for a reduced field strength at the Hall effect sensor 120 caused by the magnetically-responsive medium shorting the magnetic flux path. In some embodiments, one or more of the shaft 210 or elements of the magnet carrier 110 comprise magnetically-responsive materials, such as steel, such that the poles opposing the Hall effect sensor 120 are shorted, resulting in a further enhanced concentration in the direction of the Hall effect sensor 120.

Figure 7:
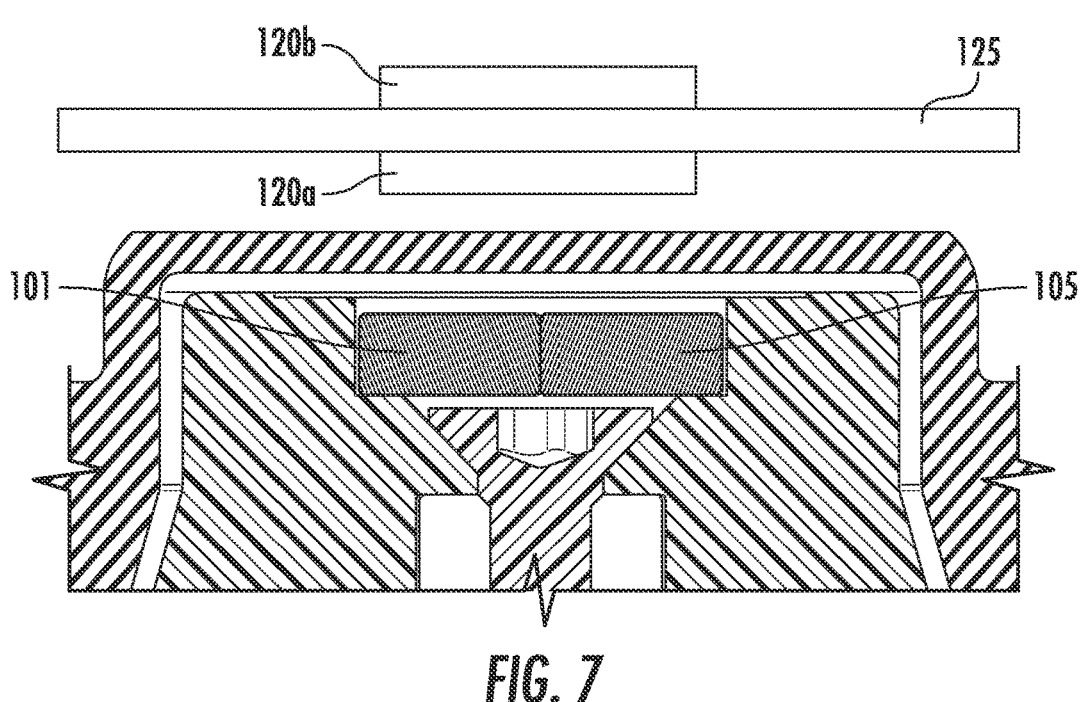
FIG. 7 is a side schematic view of a Hall effect sensor arrangement according to an embodiment of the presently disclosed subject matter.

In some embodiments, the sensor system 100 includes multiple Hall effect sensors 120. Because the present subject matter provides improved sensor functionality by increasing the directionality of the magnetic field rather than by simply increasing the strength of the magnets, the sensor system 100 is configured so as to not saturate the Hall effect sensor 120 that is proximal to the first magnet 101 and the second magnet 105. In some embodiments, this directional flux concentration further allows for better differentiation among the magnetic fields experienced at different relative positions of the first magnet 101 and the second magnet 105, which allows multiple Hall effect sensors 120 to more precisely discern the relative position of the rotating elements. In some embodiments, a first Hall effect sensor 120a and a second Hall effect sensor 120b are positioned at different relative distances with respect to first magnet 101 and second magnet 105. As illustrated in FIG. 7, in some embodiments, first Hall effect sensor 120a is positioned on a side of a printed circuit board 125 that faces towards first magnet 101 and second magnet 105, whereas second Hall effect sensor 120*b* is positioned on an opposing side of printed circuit board 125 that faces away from first magnet 101 and second magnet 105.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A system comprising:
a fixed housing having a void defined therein; a magnetically-responsive material contained within and at least partially filling the void
a movable component that is rotatable relative to the fixed housing and comprises a shaft and a rotor;
a Hall effect sensor coupled to the fixed housing and spaced apart from the movable component in a direction; and
at least two magnets coupled to the movable component in a sensing position, at which the at least two magnets is proximal to the Hall effect sensor, wherein the at least two magnets are in a side-by-side arrangement with reversed polarities to create an aggregate magnetic field having a flux concentration directed towards the Hall effect sensor, in a direction substantially orthogonal to a plane in which the movable component is movable, when the at least two magnets is in the sensing position, such that the aggregate magnetic field is concentrated in a first direction, which extends towards the Hall effect sensor, and in a second direction, which is opposite the first direction;
one or more poles attached to or integrated within the fixed housing; and
a magnetic field generator that is associated with the one or more poles, spaced apart from the rotor by the void, and controllable to generate a magnetic field causing the magnetically-responsive material to cause a change in a torsional resistance of the rotor and the shaft.

2. The system of claim 1, wherein the at least two magnets are arranged next to each other on a magnet carrier attached to the movable component.

3. The system of claim 2, wherein the magnet carrier comprises one or more elements composed of a ferrous material.

4. The system of claim 2, comprising:
a ferrous retention screw that connects the at least two magnets to the shaft;
wherein the magnet carrier is attached to the movable component by the ferrous retention screw; and
wherein the ferrous retention screw is positioned between the at least two magnets and the shaft.

5. The system of claim 1, wherein the at least two magnets are proximal to the Hall effect sensor once per rotation of the movable component.

6. The system of claim 1, comprising:
a ferrous retention screw that connects the at least two magnets to the shaft;
wherein the retention screw is positioned between the at least two magnets and the shaft.

7. The system of claim 1, wherein the Hall effect sensor is a first Hall effect sensor, the system comprising a second Hall effect sensor that is adjacent to the first Hall effect sensor.

8. A method for identifying a position of a movable component, the method comprising:
providing a fixed housing having a void defined therein;
inserting a magnetically-responsive material within and at least partially filling the void;
providing a movable component that is rotatable relative to the fixed housing and comprises a shaft and a rotor;
coupling a Hall effect sensor to the fixed housing;
coupling at least two magnets to the movable component in a sensing position, at which the at least two magnets are proximal to the Hall effect sensor, so that the at least two magnets are rotatable relative to the fixed housing, wherein the at least two magnets are in a side-by-side arrangement with reversed polarities to create an aggregate magnetic field having a flux concentration directed towards the Hall effect sensor, in a direction substantially orthogonal to a plane in which the movable component is movable, when the at least two magnets is in the sensing position, such that the aggregate magnetic field is more concentrated in a first direction, which extends towards the Hall effect sensor, than in a second direction, which is opposite the first direction;
providing one or more poles that are attached to or integrated within the fixed housing;
providing a magnetic field generator that is associated with the one or more poles and spaced apart from the rotor by the void;
moving the movable component so that the at least two magnets produce the aggregate magnetic field; and
controlling the magnetic field generator to generate a magnetic field causing the magnetically-responsive material to cause a change in a torsional resistance of the rotor and the shaft.

9. The method of claim 8, wherein arranging the at least two magnets on the movable component comprises arranging the at least two magnets next to each other on a magnet carrier attached to the movable component.

10. The method of claim 9, wherein the magnet carrier comprises one or more elements composed of a ferrous material.

11. The method of claim 9, comprising:
connecting the at least two magnets to the shaft using a ferrous retention screw; and
attaching the magnet carrier to the movable component by the ferrous retention screw;
wherein the retention screw is positioned between the at least two magnets and the shaft.

12. The method of claim 8, wherein the at least two magnets are proximal to the Hall effect sensor once per rotation of the movable component.

13. The method of claim 8, comprising:
connecting the at least two magnets to the shaft using a ferrous retention screw;
wherein the retention screw is positioned between the at least two magnets and the shaft.

14. The method of claim 8, wherein the Hall effect sensor is a first Hall effect sensor, the system comprising a second Hall effect sensor that is adjacent to the first Hall effect sensor.

* * * * *